United States Patent
Wong et al.

(10) Patent No.: US 7,633,270 B2
(45) Date of Patent: Dec. 15, 2009

(54) CHARGER

(75) Inventors: Shih-Fang Wong, Taipei Hsien (TW); Yi-Long Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 148 days.

(21) Appl. No.: 11/744,892

(22) Filed: May 7, 2007

(65) Prior Publication Data

US 2008/0054854 A1 Mar. 6, 2008

(30) Foreign Application Priority Data

Sep. 1, 2006 (CN) .......................... 2006 1 0062447

(51) Int. Cl.
 *H02J 7/04* (2006.01)
 *H02J 7/00* (2006.01)
 *H04M 1/64* (2006.01)
 *H04M 11/04* (2006.01)

(52) U.S. Cl. ..................... 320/162; 320/102; 320/107; 320/108; 320/109; 379/67.1; 455/404.1

(58) Field of Classification Search ................. 320/162, 320/107, 1, 108, 109, 110
See application file for complete search history.

(56) References Cited

U.S. PATENT DOCUMENTS

| 5,479,479 A | * | 12/1995 | Braitberg et al. | ......... 455/404.1 |
| 2003/0042868 A1 | * | 3/2003 | Muramatsu | ................. 320/107 |
| 2005/0116684 A1 | | 6/2005 | Kim | |

* cited by examiner

*Primary Examiner*—Edward Tso
*Assistant Examiner*—Yalkew Fantu
(74) *Attorney, Agent, or Firm*—Frank R. Niranjan

(57) ABSTRACT

A charger for charging a second battery is provided. The charger includes a charging circuit, a charging interface, the charger further comprise an audio interface, a switch and a sound output device. The switch used for connecting an audio interface to a charging circuit or a sound output device. When the sound output device connects to the audio interface, the sound output device plays the audio signals outputted by the audio player via the audio interface; when the charging circuit connected to the audio interface, the audio player output energy to the electronic device via the charging circuit and the charging interface, thereby charging the electronic device.

4 Claims, 3 Drawing Sheets

CHARGER

BACKGROUND OF THE INVENTION

1. Field of the Invention

The present invention relates to rechargeable battery chargers.

2. Description of Related Art

Presently an electronic device is charged by a charger which obtains energy from an alternating current (AC) voltage supply, or charged by the other electronic devices utilize a Universal Serial Bus (USB) interface. The chargers must be supplied an alternating current (AC) when obtaining the energy from an AC voltage supply, or supplied a USB cable when charging the electronic device employing a USB interface of the other electronic device such as computer. However, people often use portable electronic devices such as mobile phones, mp3s, MDs and the like without access to both the AC voltage supply and the USB cables. For example, when people use a portable electronic device during long journeys or camping, energy of the rechargeable battery of the portable electronic device will run out, without access to the AC voltage supply and the USB cable, the rechargeable battery will not be rechargeable.

SUMMARY OF INVENTION

A charger for charging an electronic device is provided. The charger includes a charging circuit, a charging interface. The charging circuit further includes a converting circuit for amplifying the alternating current (AC) audio voltage outputted by the audio player then rectifying it into a direct current voltage, an energy accumulating circuit for accumulating the direct current voltage, and an energy releasing circuit for releasing the energy accumulated by the energy accumulating circuit. The charging interface is connected with an electronic device which need to be charged. The charger further includes an audio interface, a switch, a sound output device, the audio interface is connected with an audio player. The switch is used for switching the audio interface to the sound output device or the charging circuit. When the sound output device is connected with the audio interface, the sound output device plays the audio signals outputted by the audio player via the audio interface. When the charging circuit is connected with the audio interface, the audio player supplies the electrical energy to the electronic device via the charging circuit and the charging interface, thereby charging the electronic device.

The advantage of the present invention is that the charger can be used not only as a charger to supply an electronic device with electrical energy outputted by the audio player, but also as a sound output device to play the audio signal.

DETAILED DESCRIPTION OF THE EMBODIMENTS

Figure 1:
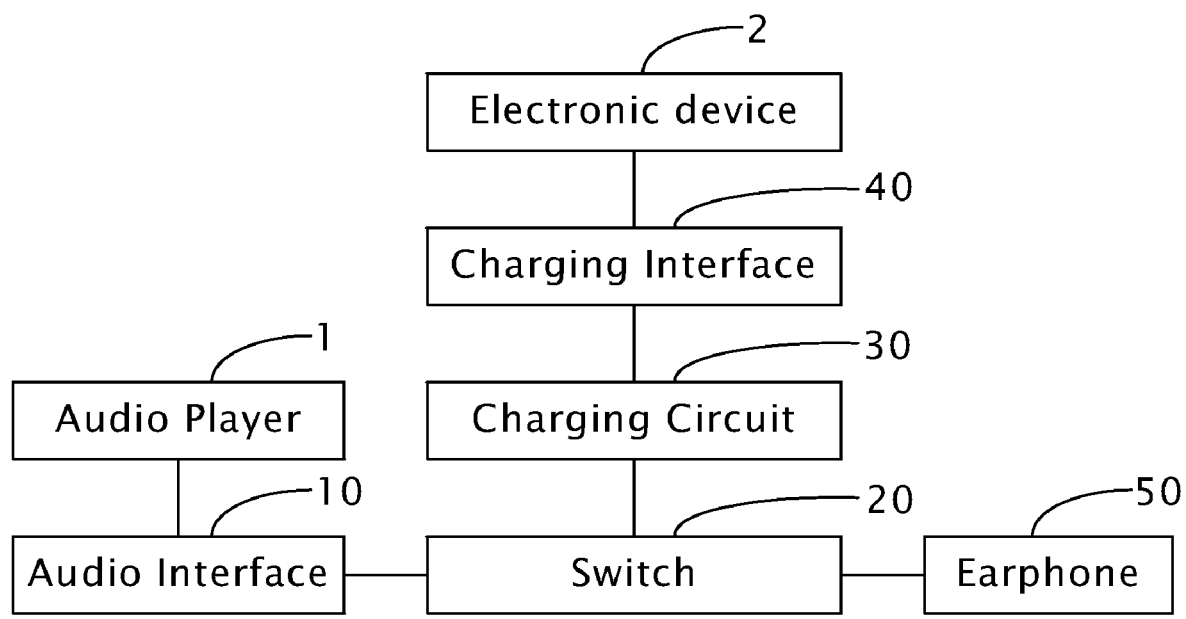
FIG. 1 is a schematic diagram of a charger in accordance with a first preferred embodiment of the present invention.

FIG. 1 is a schematic diagram of a charger in accordance with a first preferred embodiment of the present invention. The charger includes an audio interface 10, a switch 20, a charging circuit 30, a charging interface 40, and a sound output device 50. The sound output device 50 may be an earphone, speaker, etc. For simplicity, hereinafter an earphone is employed as the sound output device 50 to illustrate the preferred embodiment. The audio interface 10 is used to connect the charger to an audio player 1 that outputs audio signals and electrical energy. The charging interface 40 connects the charging circuit 30, and charges the electronic device 2 with electrical energy from the audio player 1.

Figure 2:
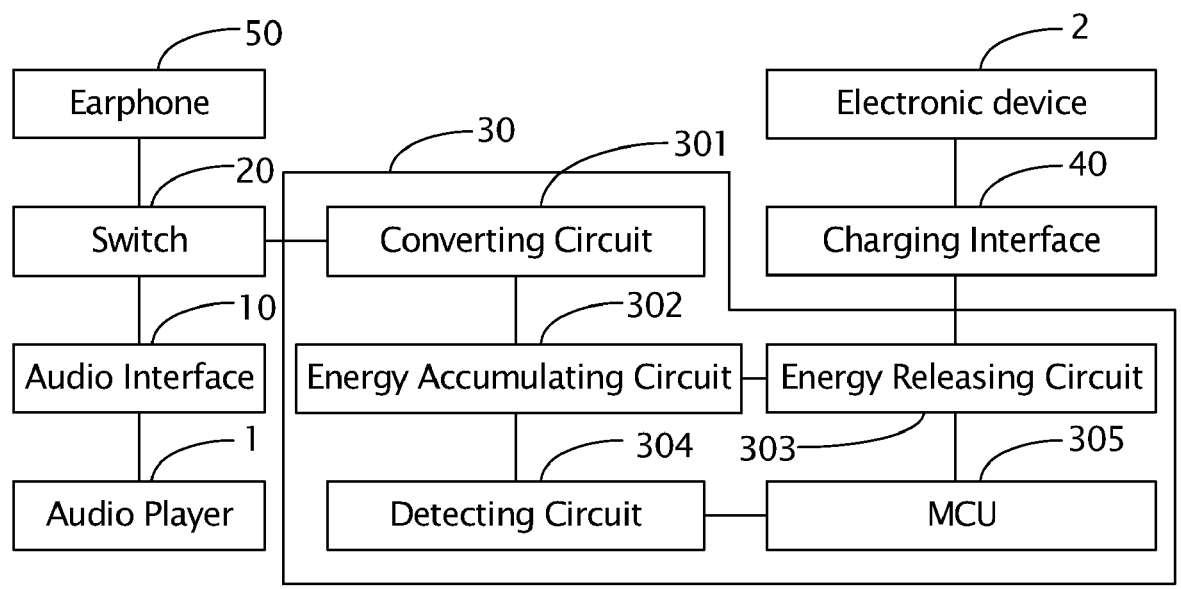
FIG. 2 is similar to FIG. 1, but showing details of a charging circuit of the charger of FIG. 1.

FIG. 2 shows details of the charging circuit 30. The charging circuit 30 includes a converting circuit 301, an energy accumulating circuit 302, an energy releasing circuit 303, a detecting circuit 304, and a Micro Control Unit (MCU) 305. The converting circuit 301 connects to the switch 20 and is used for amplifying an alternating current (AC) audio voltage outputted by the audio player 1 and rectifying the AC audio voltage into a direct current (DC) voltage. The energy accumulating circuit 302 is used for accumulating the DC voltage. The detecting circuit 304 is used for detecting a voltage value of the accumulated DC voltage and supplies the voltage value to the MCU 305; the MCU 305 compares the detected voltage value with a predetermined voltage value and obtains a comparison result, then outputs a control signal accordance with the comparison result to the energy releasing circuit 303. The control signal is used to control the energy releasing circuit 303 whether release energy to the charging interface 40 or not. Concretely, when the detected voltage value is less than the predetermined voltage value, the control signal is an inhibit signal for inhibiting the release of energy to the charging interface 40; when the detected voltage value is equal to or larger than the predetermined voltage value, the control signal is a release signal for allowing the release of energy to the charging interface 40.

Connects the audio interface 10 of the charger with the audio output interface (not shown) of audio player 1, and connect the charging interface 40 of the charger with electronic device 2. In the embodiment, the audio output interface of the audio player is an earphone jack, an earphone plug is employed as the audio interface. When the switch 20 switches the earphone 50 to the audio interface 10, the earphone 50 plays the audio signal outputted by audio player 1 to users. When the switch 20 switches the charging circuit 30 to the audio interface 10, the charger supply the electrical energy from the audio player 1 to the electronic device 2.

Figure 3:
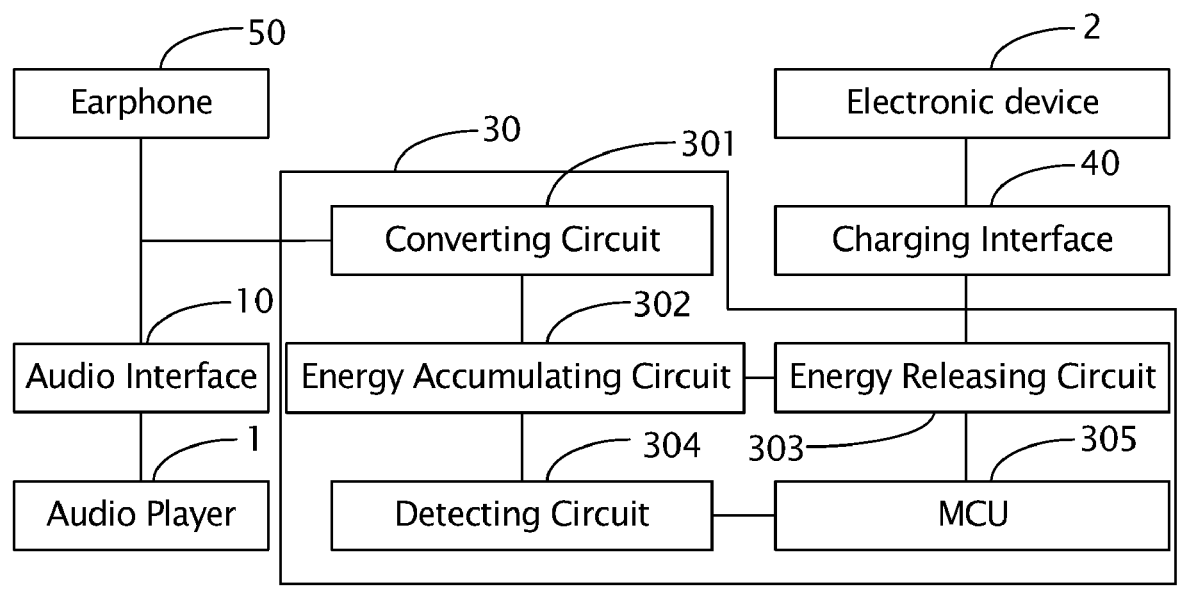
FIG. 3 is a schematic diagram of the charger in accordance with a second preferred embodiment of the present invention.

Referring to FIG. 3, the charger according to a second preferred embodiment. As compared with the first embodiment, the charger in this embodiment omits the switch 20, and the earphone 50 and the charging circuit 30 are both connected with the audio interface 10 directly.

Although the present invention has been specifically described on the basis of a preferred embodiment and method thereof, the invention is not to be construed as being limited thereto. Various changes or modifications may be made to the embodiments without departing from the scope and spirit of the invention.

What is claimed is:

1. A charger comprising: a charging circuit, a charging interface connected to an electronic device, and an audio interface being configured for connecting with an audio player to receive electrical energy or audio signals therefrom, wherein, the charger further comprises a switch and a sound output device, the switch is configured for switch the audio interface to connect with the charging circuit or with the sound output device; the charging circuit comprises a converting circuit, a energy accumulating circuit, and an energy releasing circuit; when the switch switches the audio interface to connect with the charging circuit, the converting circuit amplifies an alternating current (AC) audio voltage outputted by the audio player and rectifying the AC audio voltage into a direct current (DC) voltage; the energy accumulating circuit accumulates the DC voltage, and the energy releasing circuit releases the electricity energy to the electronic device via the charging interface when the accumulated voltage value is equal to or greater than a predetermined voltage value; when the switch switches the audio interface to connect with the sound output device, the sound output device receives the audio signals from the audio player and outputs the audio signals.

2. The charger as claimed in claim 1, wherein the charging circuit further comprises a detecting circuit and micro-control unit, the detecting circuit is used for detecting a voltage value of the accumulated DC voltage and supplying the detected voltage value to the micro-control unit (MCU); the MCU compares the detected voltage value with a predetermined voltage value and outputs a control signal corresponding to the comparison result to the energy releasing circuit; the control signal is used for controlling the energy releasing circuit.

3. The charger as claimed in claim 2, wherein if the detected voltage value is equal to or greater than the predetermined voltage value, the control signal is a release signal for signaling the energy releasing circuit to release energy to the charging interface.

4. The charger as claimed in claim 2, wherein if the detected voltage value is less than the predetermined voltage value, the control signal is an inhibit signal for signaling the energy releasing circuit to stop releasing energy to the charging interface.

* * * * *